July 25, 1933.  A. D'HALLOY  1,919,205
BOLT AND NUT CLAMPING DEVICE
Filed Dec. 11, 1928

A. D'Halloy
INVENTOR

By Marks & Clark
Attys.

Patented July 25, 1933

1,919,205

UNITED STATES PATENT OFFICE

AUDOIN D'HALLOY, OF PARIS, FRANCE, ASSIGNOR TO INTERNATIONAL SAFETY LOCK NUT CORPORATION, OF NEW YORK, N. Y., A CORPORATION OF DELAWARE

BOLT AND NUT CLAMPING DEVICE

Application filed December 11, 1928, Serial No. 325,311, and in France January 20, 1928.

The invention relates to a locking device and more particularly to the type comprising a bolt and nut member.

When any members are assembled or clamped together by means of bolts and nuts, it is easily understood that it would be necessary in order to secure a correct positioning of the bolt and the nut, which positioning is indispensable for obtaining an efficient and durable clamping action for the following theoretical conditions to be satisfied at the same time:

(a) The faces of the parts to be clamped together which are in contact respectively with the nut and with the head of the bolt must be perfectly flat and parallel to each other.

(b) The faces of the nut and of the head of the bolt in contact with the parts to be clamped (which will be designated hereinafter as the lower faces of the nut and of the bolt head) must be perfectly flat and perpendicular to the axis of the bolt.

(c) The hole formed in the parts for receiving the bolt must be perpendicular to the faces of the said parts.

Now, in practice these conditions are never realized at the same time since on account, on the one hand, of a more or less defective machining of the parts to be clamped, the faces of which are rarely flat and parallel and the hole which may not be perpendicular to their faces which are assumed to be parallel and, on the other hand, the equally defective machining of the bolts and nuts which are most usually mass produced and the lower faces of which comprise burrs forming rough projecting edges, making it impossible to obtain the theoretical contact of the whole plane of the said lower faces with the parts to be clamped, since some only of these rough projections bear against the parts to be clamped.

This being so, a great improvement in the art of clamping parts together has been obtained by the use of so-called lock nuts and in particular of the type of lock nut described in my prior applications Serial No. 211,236 filed Aug. 6, 1927, 245,531, filed Jan. 9, 1928, 320,960, filed Nov. 1, 1928, on account of the fact that certain of the above mentioned disadvantages are thus obviated by avoiding the contact of the rough projections which may exist upon the lower face of the nut with the corresponding face of the parts assembled, and by allowing for the fact that the faces of the parts to be clamped are not parallel and, to a certain extent, for the inclination of the hole in the parts or that of the axis of the bolt.

Nevertheless, in spite of the importance of the results obtained by these improvements which give a very effective and durable clamping action in cases when the bolt head is quite flat, parallel to the face with which it makes contact and perpendicular to the axis of the bolt, the problem of assembly by means of bolts and nuts does not appear to have been solved by these means in a complete and satisfactory manner on account of the fact that the advantages obtained by the use of the lock nut of the type hereinbefore mentioned may be reduced in certain cases and particularly when the lower face of the bolt head comprises burrs or when although it is quite flat, it is not parallel to the corresponding face of the parts assembled or is not perpendicular to the axis of the bolt or, again, when the axis of the whole is not perpendicular to the faces of the parts to be assembled.

The object of the invention is to remove all the disadvantages of clamping devices, while permitting use to be made of the ordinary bolts and nuts manufactured by mass production. By making only slight modifications therein and with this object in view, it consists in an improved bolt and nut clamping device characterized by the feature that it comprises in combination with a lock nut an elastic locking washer preferably of the type described in the hereinbefore mentioned applications, a bolt slightly modified in that the head is hollowed out on the lower face with an annular groove of varying section and width and by the feature that it comprises a split and elastic washer of the Grower type partly engaged in the said groove, preferably of corresponding section, and bearing upon the face of the assembled members.

A further object of this invention is the manufacture of a new type of lock washer similar in its features to the lock washer described in the hereinbefore mentioned application except that instead of being spiralled, as is normally the case, in a direction corresponding to a thread of a lefthand screw it is reversed and is spiralled in a direction corresponding to a thread of a righthand screw.

This improved device is hereinafter described in detail with reference to the accompanying drawing, which represents some of the possible embodiments which are given by way of example.

Figure 1:
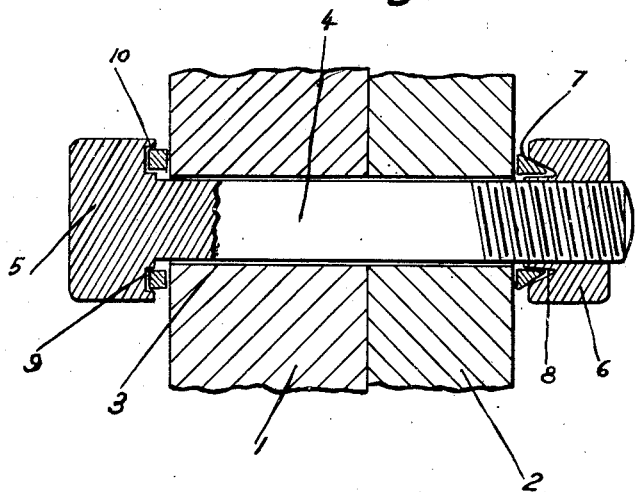
Figure 1 is a vertical sectional view of the improved device.
Figure 2:
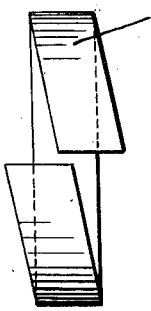
Figure 2 is a detail view to a larger scale of the washer adapted to be engaged partly in the groove in the bolt head.

In these figures 1 and 2 are the parts to be clamped together, 3 is the hole formed in these parts for receiving the clamping bolt 4 and having a head 5. The attachment is secured by means of a lock nut 6 of the above mentioned known type comprising an elastic locking ring 7 of the Grower type placed between the part 2 and the nut 6, and exerting a wedging action in the interior of an annular groove or recess 8 formed in the nut, the screw threaded portion of which nut 6 may, in certain cases, as shown in the drawing, extend beyond the lower face of the nut so as to increase the height of the inner wall of the groove 8.

In order to construct the improved clamping device according to the invention an annular groove 9 of rectangular or other suitable section of varying depth is formed in the bolt head on its inner face and between the head 5 of the bolt 4 and the part to be assembled is placed a split and elastic washer 10 of the Grower type, preferably of rectangular or other suitable section and of varying height equal, for example, to three times the depth of the groove 9 in which it is engaged.

By means of this arrangement all contact between the inner face of the bolt head and the part 1 is avoided thus removing the disadvantages resulting from the presence of burrs forming rough projections upon the bolt head and those resulting from the surfaces not being parallel on account of the elasticity of the split washer 10, thus permitting a truly efficient clamping action.

In order to prevent any accidental snapping and facilitate slackening of the attachment when desired the washer 10 is preferably formed no longer after the manner of ordinary Grower rings but by a spiral turn in the reverse direction to the latter as shown in Figure 2, the direction of this helical turn being consequently the same as that of the threads of the bolt, that is, washer 10, being split, comprises offset and spaced terminal portions which follow the same direction as the threads of the bolt. By means of this construction the washer 10, as soon as the slackening action commences a terminal portion of the washer cuts into or penetrates and becomes braced in the part 1, thus obviating any risk of accidental slackening and preventing, moreover, the bolt 4 from turning when the nut 6 is turned in order to unscrew it. Further, the engagement of the washer 10 in the groove 9 in the bolt head presents the advantage when the nut is slackened of compelling the washer to bite into the part 1 and at the same time to prevent the washer from opening beyond its limit of elasticity and breaking on account of its lateral support.

It is clearly understood that it is possible, without going outside the scope of the invention to provide improvements in details and also modifications.

Figure 3:
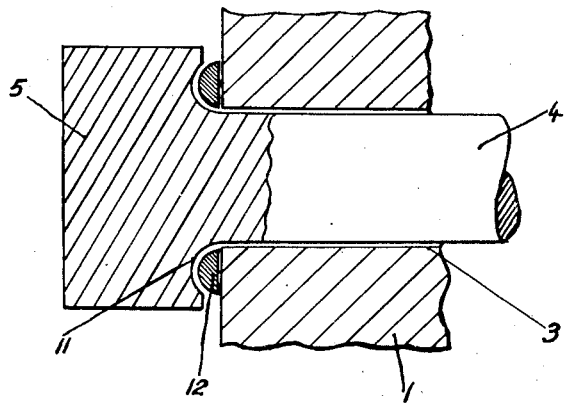
Figure 3 is a vertical sectional view of a modified form of the improved device.

For example, in certain cases it may be advantageous to provide for the head 5 of the bolt 4 a mounting permitting the washer to become centered upon the stem of the bolt under all circumstances so as to obtain the constant application of the bearing surfaces on the one hand, of the base of the washer upon the part 1 to be assembled and, on the other hand, on the groove in the bolt head upon the upper surface of the washer. For this purpose an annular groove 11 is provided, the cross sectional profile of which comprises a circular arc, the washer 12 having a corresponding cross section, for example, half round as shown diagrammatically in Figure 3.

What I claim is:

1. In combination with an assembly member, a locking device comprising a bolt adapted to loosely pass through said member, a head extending from said bolt and containing an annular recess, and a washer of the Grower type disposed in said recess and spacing said head from said member, and means associated with said bolt for non-rotatably holding said washer in said recess and rigidly against said member.

2. In combination with an assembly member, a locking device comprising a bolt adapted to pass through said member, means comprising an enlarged portion extending from said bolt and containing a groove, a washer of the Grower type non-rotatably disposed in said groove and abutting said assembly member, and means associated with said bolt for moving said enlarged portion towards said member, contracting said washer and clamping it rigidly against said member.

3. In combination with an assembly member, a bolt adapted to pass therethrough, a head extending from said bolt and containing a groove, a split helicoidal washer disposed in said groove and abutting said assembly member, a nut adjustably carried by said bolt, whereby said washer may be contracted but non-rotatably held in said groove for rigidly clamping said member.

4. In combination with an assembly member, a bolt passing therethrough, a head extending from said bolt and comprising a groove, a yieldable split helicoidal washer spiralled in the same direction as the threads of said bolt and non-rotatably held in said groove and abutting said member, and adjustable means at one end of said bolt for forcing said head towards said assembly member contracting said washer, and means carried by said washer for penetrating into said member upon the release of said adjustable means.

5. In combination with an assembly member, a bolt passing therethrough, a head having a groove, a split member having offset but spaced terminal portions and extending in the direction of the threads of said bolt, and disposed in the groove of the head a nut having a groove, an elastic member disposed in the groove of the nut, means upon the application of a rotary force to said nut, for contracting said split and elastic members but preventing the rotation of said bolt whereby said assembly member is clamped.

6. In combination with an assembly member, a bolt passing therethrough, a head having a groove, a split member having offset but spaced terminal portions and extending in the direction of the threads of said bolt, and disposed in the groove of the head a nut having a groove, an elastic member disposed in the groove of the nut, means upon the application of a rotary force to said nut for contracting said split and elastic members but preventing the rotation of said bolt whereby said assembly member is clamped, and means upon the release of said nut whereby a terminal portion of said split member penetrates into said assembly member.

7. In combination with an assembly member, a locking device comprising a bolt passing through said member, a headed portion on said bolt, an adjustable nut carried by said bolt, and split helicoidal washers spiralled in opposite directions and respectively spacing said head and said nut from said member in the clamped position thereof.

8. As an article of manufacture, comprising, a split helicoidal washer spiralled in a direction corresponding to the direction of a right hand screw thread.

AUDOIN d'HALLOY.